(12) United States Patent
Sainz de Diego

(10) Patent No.: US 10,442,004 B2
(45) Date of Patent: Oct. 15, 2019

(54) PIPE CUTTER WITH GAUGE AND REAMER/BEVELLER OF CUT PIPE EDGES

(71) Applicant: Rothenberger, S.A., Abadiano (Vizcaya) (ES)

(72) Inventor: Cesar Sainz de Diego, Abadiano (ES)

(73) Assignee: ROTHENBERGER, S.A., Abadiano (Vizcaya) (ES)

( * ) Notice: Subject to any disclaimer, the term of this patent is extended or adjusted under 35 U.S.C. 154(b) by 33 days.

(21) Appl. No.: 15/454,603

(22) Filed: Mar. 9, 2017

(65) Prior Publication Data

US 2017/0259342 A1   Sep. 14, 2017

(30) Foreign Application Priority Data

Mar. 10, 2016  (ES) .................. 201630276
Nov. 23, 2016  (ES) .................. 201631500

(51) Int. Cl.
| | | |
|---|---|---|
| B23B 5/16 | (2006.01) | |
| B23B 5/14 | (2006.01) | |
| B23D 21/00 | (2006.01) | |
| B23D 21/08 | (2006.01) | |

(52) U.S. Cl.
CPC .............. B23B 5/16 (2013.01); B23B 5/14 (2013.01); B23B 5/167 (2013.01); B23D 21/006 (2013.01); B23D 21/08 (2013.01); B23B 2215/72 (2013.01); B23B 2220/04 (2013.01); B23B 2220/08 (2013.01)

(58) Field of Classification Search
CPC ....... B23B 5/167; B23B 5/16; B23B 2220/08; B23B 5/14; B23B 2215/72; B23B 2220/04; B23D 21/006; B23D 21/08

USPC ..................................... 30/92; 408/211, 224
See application file for complete search history.

(56) References Cited

U.S. PATENT DOCUMENTS

| | | | | |
|---|---|---|---|---|
| 1,563,260 A | * | 11/1925 | Cromley | B23B 5/168 408/216 |
| 2,761,335 A | * | 9/1956 | Bernardi | B23B 5/168 408/224 |
| 2,968,822 A | * | 1/1961 | Coblitz | B23B 5/163 408/118 |
| 3,232,145 A | * | 2/1966 | Wilson | B23B 5/167 144/205 |

(Continued)

FOREIGN PATENT DOCUMENTS

| | | |
|---|---|---|
| EP | 2 801 426 A1 | * 11/2014 |
| EP | 3 222 378 A1 | * 9/2017 |

(Continued)

Primary Examiner — Hwei-Siu C Payer
(74) Attorney, Agent, or Firm — Lucas & Mercanti, LLP

(57) ABSTRACT

A pipe cutter with gauge and reamer/beveller of the cut edges of pipe. On the body of the pipe cutter there is at least one gauge; between it and the body a cavity is delimited capable of accepting the end of a pipe (t); each gauge having on its end a mouth that varies its diameter between a minimum (d1) at its base and a maximum (d) that coincides with the gauge of the pipe (t) it accepts. There is also at least one blade on each existing gauge or on a beveller equipped with one or several portions (S) with at least one blade on each of them. A pipe (t) is inserted in the corresponding gauge, first gauging the diameter of its cut edge and then the blades simultaneously bevel and ream the cut pipe (t) edge.

10 Claims, 10 Drawing Sheets

(56) References Cited

U.S. PATENT DOCUMENTS

| | | | | |
|---|---|---|---|---|
| 3,266,345 | A | * | 8/1966 | Weisner .................. B23B 5/168 144/205 |
| 3,564,685 | A | * | 2/1971 | Bjalme .................. B23B 5/168 144/205 |
| 3,661,472 | A | * | 5/1972 | Beauloye ................ B23B 5/168 30/92 |
| 3,807,258 | A | * | 4/1974 | Bjalme .................. B23B 5/168 30/293 |
| 3,976,388 | A | * | 8/1976 | Webb ...................... B23B 5/167 408/211 |
| 4,274,770 | A | * | 6/1981 | Singer .................... B23B 5/168 30/172 |
| 5,020,401 | A | * | 6/1991 | Jiles ........................ B23B 5/167 144/205 |
| 7,029,211 | B2 | * | 4/2006 | Oswald .................. B23B 5/168 408/211 |
| 7,429,153 | B2 | * | 9/2008 | Dole ....................... B23B 5/168 408/211 |
| 2017/0259342 | A1 | * | 9/2017 | Sainz de Diego ... B23D 21/006 |

FOREIGN PATENT DOCUMENTS

| | | |
|---|---|---|
| ES | 1033268 U | 2/1996 |
| GB | 2 234 697 A * | 2/1991 |

* cited by examiner

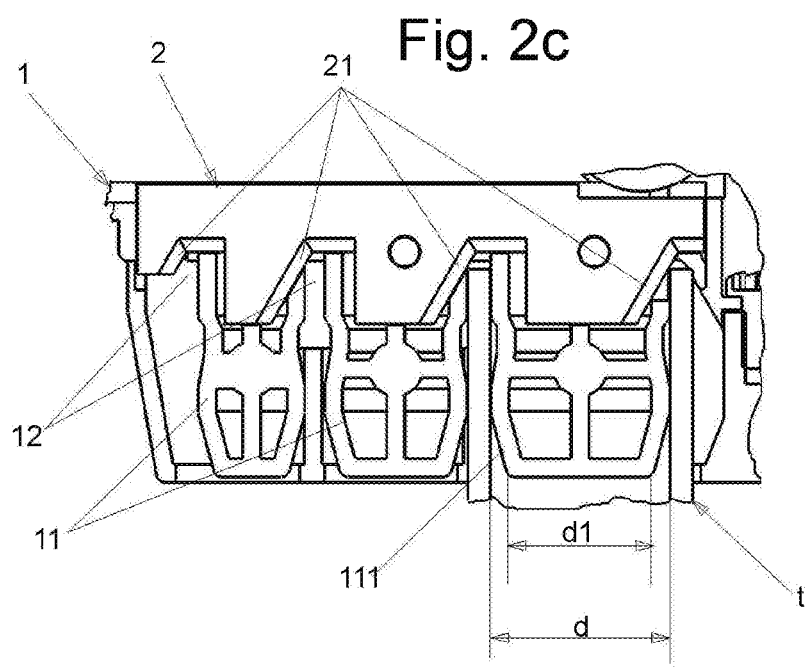

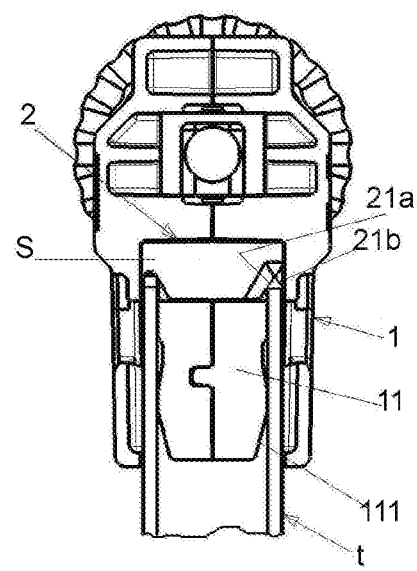

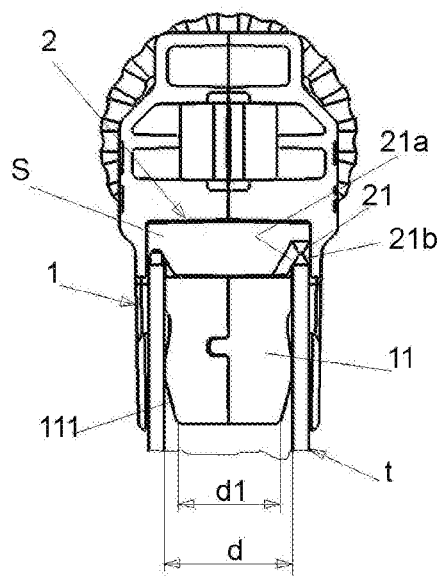

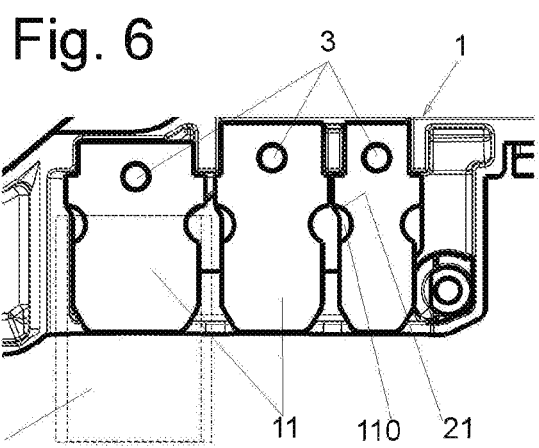

PIPE CUTTER WITH GAUGE AND REAMER/BEVELLER OF CUT PIPE EDGES

OBJECT OF THE INVENTION

The object of the invention refers to a pipe cutter that incorporates at least one gauge and at least one reamer/beveller on the pipe cutter body; in such a manner that by its use it is possible to:
first gauge the cut pipe edge to again leave its diameter the same as the rest of the inner pipe diameter;
then bevel and ream that is, remove the burrs); performing these operations simultaneously.

BACKGROUND OF THE INVENTION

In the current state of the art, pipe cutters are extensively used. In the scope of the invention, the term "pipe cutter" is in reference to the portable manual tools used to cut round pipes, generally of small diameter, used in supply conduits (such as gas or water).

In the current state of the art, even the incorporation in these pipe cutters of a multi-purpose blade is known, the main purpose of which is, in practice, to eliminate burrs remaining on the edges of pipes after they are cut. For example, in Spanish documents ES0145687U and ES1033268, among others, pipe cutters are described equipped with blades for removing burrs.

Technical Problem to be Resolved

Operations of cutting of the pipes used in supply conduits are done by pressure (the cutting disc presses on the pipe perimeter until it is cut); thus, the cut pipe edge is deformed (with a diameter in this zone slightly smaller than the gauged diameter of the rest of the pipe) and with burrs. Current regulations require pipes used in supply conduits to have burrs eliminated and the cut edges to be bevelled inside and outside. It also requires uniform gauging throughout the piping, including the joints or junctions between pipes.

To comply with these requirements, operations are required that are very slow and complicated to perform (if not directly impossible to carry out) with the technical solutions incorporated by current pipe cutters.

Description of the Invention

The object of the invention offers a new technical solution that makes it possible to regauge cut pipe edges (edges which have been deformed during the cutting operation) and eliminate the burrs in them simultaneously. This technical solution is incorporated in the pipe cutter body. In addition, the technical solution which is the object of the invention makes it possible to act on pipes of different diameters. It is characterized in that:

a).—on the pipe cutter body there is at least one gauge; between it and the pipe cutter body a cavity is delimited which is capable of accepting the end of a pipe positioned in said gauge; each gauge having on its end a mouth that varies between a minimum diameter at its base and a maximum diameter that coincides with the gauge of the pipe it accepts;
b).—there is at least one blade that reaches said cavity.
c).—each gauge is a solid of revolution that is aligned with the corresponding beveller; thus, the pipe inserted in the corresponding gauge and turning it, first the cut pipe edge is gauged to leave its diameter the same as the diameter of the rest of the inside of the pipe and then, when the gauged edge advances in the corresponding cavity, the blades bevel and ream said edge simultaneously.

Particularly:
a) on the pipe cutter body, there is at least one beveller, structured in one or several portions equipped with at least two converging edges, at least one of them comprising a blade that reaches a cavity; and where said portions can be arranged in any angular position with respect to the main axis of the pipe cutter.
b) on the pipe cutter body are formed several gauges of different diameters; between them and the body are delimited several cavities capable of accepting ends of pipes of different diameters, which are positioned in a corresponding gauge.

The blades are formed on the beveller or directly on the gauge.

If the blades are formed on the beveller each two contiguous blades reach two zones diametrically opposite each other of a single cavity, performing reaming/bevelling simultaneously inside and outside the cut pipe edge. It makes no difference, and it is included in the object of the invention if the blades form on the beveller:
that stated portions provided with at least two converging edges, at least one of which is a blade, are formed in a single beveller or in different/independent bevellers;
that the blades defined in said portions of the beveller show configuration with a cutting zone in chamfer or with two "V" angled cutting zones;
If the blades are formed directly on the gauge each blade reaches a cavity performing reaming/bevelling inside the cut pipe edge. It makes no difference, and it is included in the object of the invention, if the blades form directly on the gauge:
that each gauge is an independent element that is fastened on the pipe cutter body using screws, rivets or similar fasteners;
that each gauge integrates in itself the reaming/bevelling blades, there being at least as many blades as there are gauges: each gauge defines in its perimeter a zone lowered as a ramp where it forms or directly incorporates at least one reaming/bevelling blade;

In particular, on the pipe cutter body there are, at least, two aligned gauges of different diameters. Between two of these gauges, and/or between one of them and the pipe cutter body, at least two cavities are delimited capable of accepting pipes of different diameters, that are positioned on a corresponding gauge; thus, when the gauged pipe edge advances in the corresponding cavity, the gauge blades perform the reaming/bevelling inside the pipe.

Other configurations and advantages of the invention can be deduced from the following description, and from the subsidiary claims.

DESCRIPTION OF THE DRAWINGS

To better understand the object of the invention, a preferential form of embodiment is represented in the figures, subject to accessory changes which do not essentially alter it. In this case:

FIGS. 2a, 2b and 2c each represent detailed longitudinal sections corresponding to the embodiment of FIG. 1, each one with a pipe (t) of a different diameter inserted in its corresponding gauge (11) and for an example of embodiment in which the portions (S) equipped with blades (21) are arranged longitudinally on a single beveller (2).

FIGS. 3a, 3b and 3c each represent detailed cross-sections corresponding to the embodiment of FIG. 1, each one with a pipe (t) of a different diameter inserted in its corresponding gauge (11) and for an example of embodiment in which the portions (S) equipped with blades (21) are arranged transversally, on a single beveller (2) or on different/independent bevellers (2).

FIG. 6 represents an enlarged schematic detail view corresponding to the embodiment of FIG. 4, to observe the integration of the blades (21) on the gauges (11).

Represented in FIG. 6 a diagram of a pipe (t) in operating position.

DETAILED DESCRIPTION OF A PREFERENTIAL EMBODIMENT

The following is a description of an example of practical, non-limiting embodiment of this invention. Other modes of embodiment, in which accessory changes are introduced that do not essentially alter it, are in no way disregarded.

The object of the invention refers to a pipe cutter with gauge and reamer/beveller of cut pipe edges.

The technical solution, according to the invention, is applied on a pipe cutter body (1) and makes it possible, first, to gauge the edges cut to again leave its diameter the same as the rest of the inner pipe (t) diameter and then, in a single operation, bevel and ream the cut edge of the pipes (t).

Figure 1:
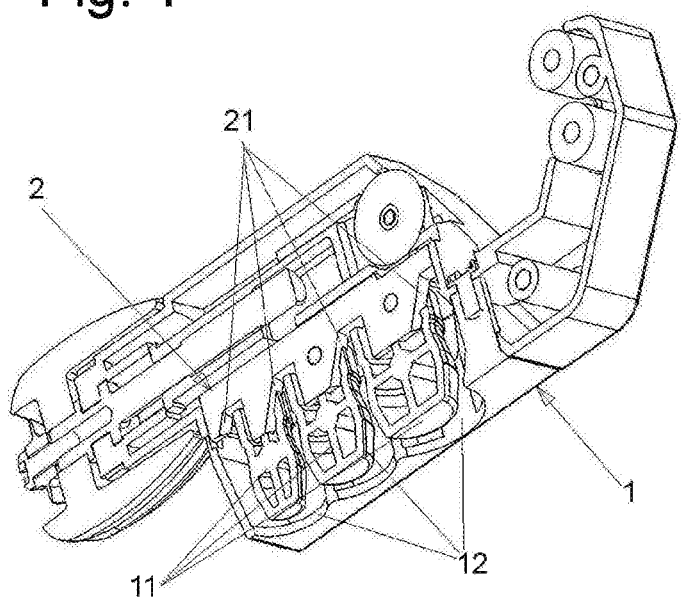
FIG. 1 represents a general schematic view in sectional perspective of a pipe cutter with gauge and reamer/beveller of cut pipe edges, according to the invention, for an example of embodiment that accepts pipes of three different diameters; where the blades (21) bevel and ream simultaneously inside and outside the cut pipe (t) edge.
Figure 2A:
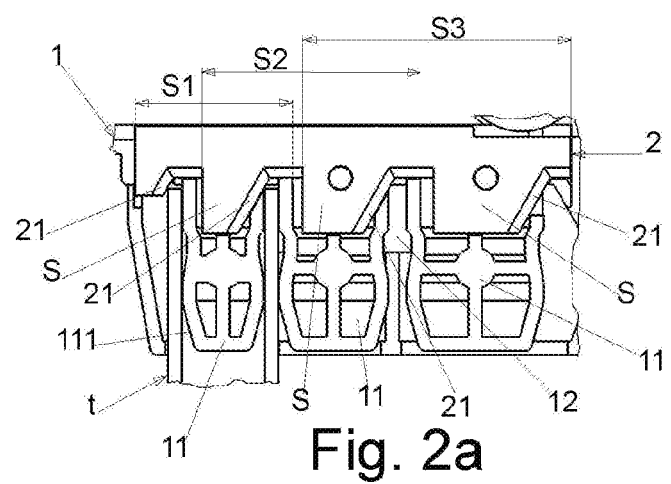

The operations of bevelling and reaming, according to the embodiment of FIGS. 1 to 3, are performed simultaneously on the inside and outside of a cut pipe (t) edge.

Figure 4:
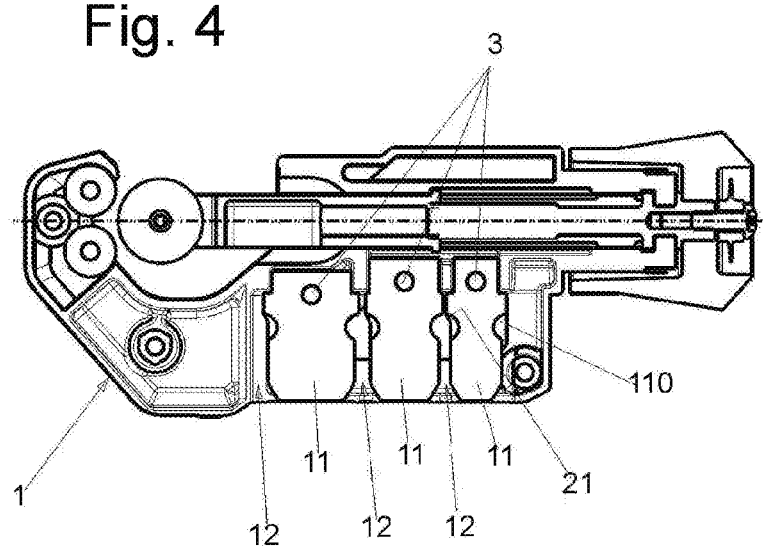
FIG. 4 represents a general schematic sectional view of the object of the invention, for an example of embodiment that includes three gauges (11) fastened with screws (3), rivets or similar fasteners to the body (1) of the pipe cutter; and each of which define a zone on ramp (110) that integrates a blade (21).
Figure 5:
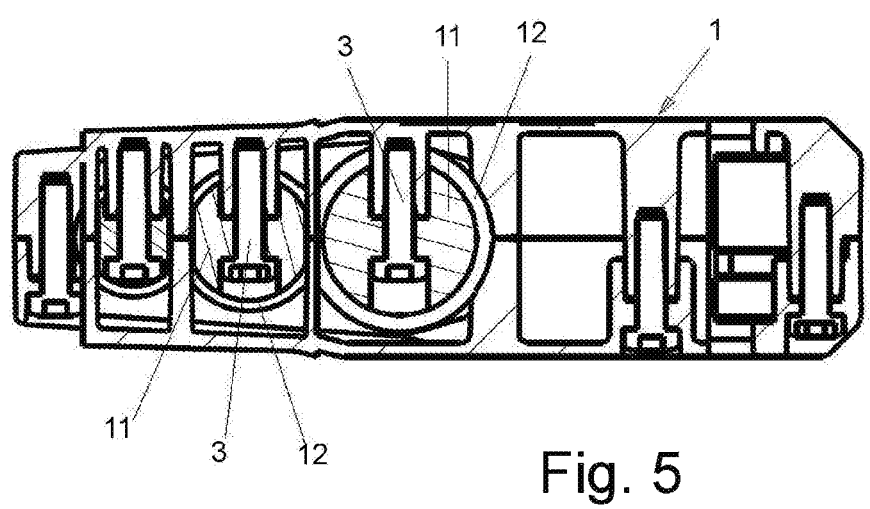
FIG. 5 represents a detailed longitudinal plan section corresponding to the embodiment of FIG. 4, to observe the cavities (12) and the fastening of the gauges (11) to the body (1) of the pipe cutter.

The operations of bevelling and reaming, according to the embodiment of FIGS. 4 to 6, are performed simultaneously on the inside of a cut pipe (t) edge.

In addition, this technical solution makes it possible, for any of the embodiments, to, on the pipe cutter, gauge, bevel and ream pipes (t) of different diameters.

In conformity with the invention, and according to the embodiment represented in FIGS. 1 to 3, on the body (1) of the pipe cutter one or several gauges (11) are formed. Between each gauge (11) and the body (1) of the pipe cutter is delimited a cavity (12). Each of these cavities (12) is capable of accepting the corresponding end of a pipe (t), which is positioned on a corresponding gauge (11).

It makes no difference, for the purposes of the invention, to form one or several gauges (11) as long as the beveller (2) is equipped with a suitable quantity of blades (21).

Figure 2B:
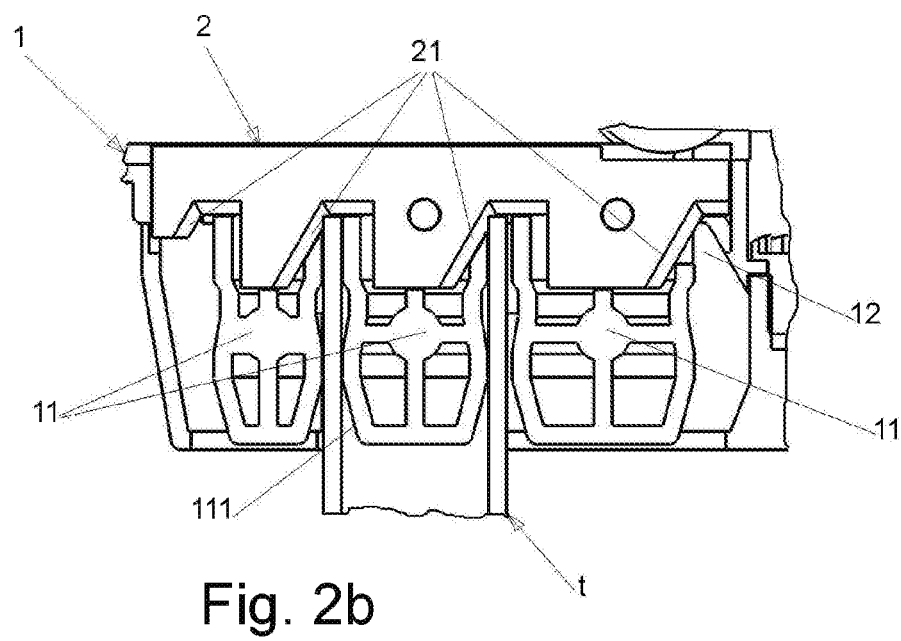

The gauge (11), or each of the existing gauges (11), is a solid of revolution that has a mouth (111) on its end. The generatrix of this mouth (111) varies between a minimum diameter (dl) at its base and a maximum diameter (d) that coincides with the gauge of the pipe (t) it accepts. Thus, when a cut pipe (t) edge, having a deformity that causes the diameter of the cut pipe (t) edge to be smaller in one or more regions than the diameter of the rest of the inner pipe (t) diameter, enters the gauge (11) and is pushed onto and around the mouth (111) of gauge (11) until the cut pipe edge (t) enters cavity (12), as shown in FIG. 2B, the mouth (111) reshapes the deformed portion to conform to the shape of the mouth (111) at its maximum diameter (d). As a result, the deformity on pipe edge (t) is corrected and the cut pipe edge (t) is regauged, leaving the diameter of the cut edge uniformly the same as the rest of the inner pipe (t) diameter.

Arranged on the body (1) of the pipe cutter is, at least one beveller (2) with one or several portions (S) equipped with, at least, two converging edges; at least one of said edges comprising a blade (21).

Each of the existing blades (21) reach a corresponding cavity (12).

The angular position in which the portions (S) are arranged with respect to the main axis of the pipe cutter makes no difference, for the purposes of the invention: they can be arranged in any angular position with respect to the main axis of the pipe cutter.

It also makes no difference, for the purposes of the invention, that there is a single beveller (2) with several portions (S) that define the blades (21) or several bevellers (2), each one with, at least, one portion (S) that defines the blades (21).

In the example of embodiment of FIGS. 1, 2a, 2b, 2c there is a beveller (2) longitudinally with respect to the body (1) of the pipe cutter and equipped with several portions (S) of different widths (S1), (S2), (S3) in correspondence with the different diameters of the pipes (t) to bevel. One blade (21) reaches on the outside of the pipe (t) edge and another contiguous blade (21) reaches on the inside that same edge; thus, between both, they perform the bevelling and remove the burrs simultaneously on the inside and the outside of the cut pipe edge. (t).

In this example of embodiment:
  forming a gauge (11) a cavity (12) is delimited; the beveller (2) is equipped with a portion (S) that defines two blades (21) to make it possible to ream/bevel pipes (t) of a particular diameter;
  forming two gauges (11) two cavities (12) are delimited; the beveller (2) is equipped with two contiguous portions (S) that define three blades (21) so that in the same pipe cutter it is possible to ream/bevel pipes (t) of two different diameters.
  in general, forming "n" gauges (11) "n" cavities (12 are delimited); the beveller (2) is equipped with "n" contiguous portions (S) that define "n+1" blades (21) so that in the same pipe cutter it is possible to ream/bevel pipes (t) of "n" different diameters.

The pictures correspond to an example of embodiment in which three gauges (11) have been formed delimiting three cavities (12) around them. The beveller (2) is equipped with three contiguous portions (S) of widths (S1), (S2), (S3) which are partially superimposed, defining four blades (21) and, therefore, in this example of embodiment, it is possible to ream/bevel pipes (t) of three different diameters. The partial superimposition of the widths (S1), (S2), (S3) reduces the total length of the beveller (2).

Figure 3A:
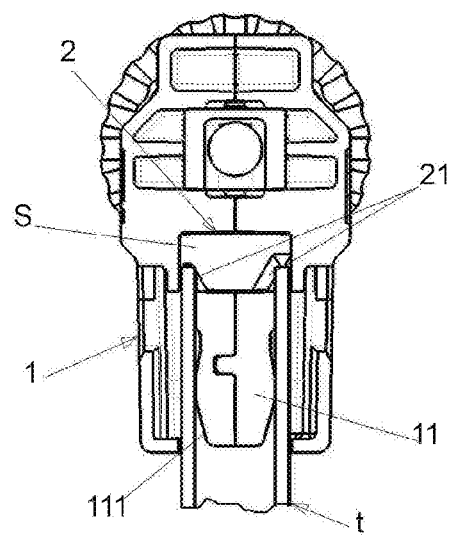

In the example of embodiment of FIGS. 3a, 3b, 3c the equipped portions (S) of blades (21) can be formed on a single beveller (2) or on independent bevellers (2); there being in this case, a beveller (2) for each gauge (11).

The portion (S), or each existing portion (S), is equipped with at least, one blade (21). Preferentially, in each portion (S) there are two blades (21) that reach two zones diametrically opposite each other in a single cavity (12). Each blade

(21) has two "V" angled cutting zones (21a), (21b), which, respectively, perform the bevelling and remove the burrs from the pipe (t) simultaneously on the inside and outside of its cut edge.

With this structure and these particularities, the pipe (t) is inserted in the corresponding gauge (11) and turning it first, the cut pipe (t) edge is gauged to leave its diameter the same as the diameter of the rest of the inside of the pipe (t) and then, when the gauged edge advances in the corresponding cavity (12), the blades (21) bevel and ream said edge simultaneously on the inside and outside of the pipe (t).

In conformity with the invention and according to the embodiment represented in FIGS. 4 to 6, there is at least one gauge (11) on the body (1) of the pipe cutter; each gauge (11) being an independent element that is fastened on the body (1) using screws (3), rivets or similar fasteners.

The gauge (11), or each gauge (11) if there are several, is structured in a solid of revolution that defines on its perimeter a zone lowered as a ramp (110) where it forms or directly incorporates at least one reaming/bevelling blade (21). Each gauge (11) integrates in itself the blades (21), there being at least as many blades (21) as gauges (11).

In conformity with the invention and according to the embodiment represented in FIGS. 4 to 6, there are at least two gauges (11) of different diameters. These gauges (11) are aligned, delimiting between two of them, and/or between one of them and the body (1) of the pipe cutter, at least two cavities (12) capable of accepting ends of pipes (t) of different diameters, which are positioned on a corresponding gauge (11).

According to the embodiment represented, there are three gauges (11) aligned and fastened on the body (1) with screws (3), rivets or similar fasteners. See FIG. 5.

In this example of embodiment three gauges (11) have been arranged which, in conjunction with the body (1) of the pipe cutter, delimit three cavities (12): one around each gauge (11) always considering that the common interspace delimited by two contiguous gauges (11) forms part of one cavity (12) or another depending on whether the pipe (t) is inserted into one gauge (11) or another. Each blade (21) integrated in a single gauge (11) reaches a corresponding cavity (12).

In general, forming "n" gauges (11) there are at least "n" blades and "n" cavities (12) are delimited so that in a single pipe cutter it is possible to ream/bevel pipes (t) of "n" different diameters.

With this structure, these components and particularities, when the gauged edge of a pipe (t) advances in the corresponding cavity (12), the corresponding blade (21) integrated in the corresponding gauge (11) reaches said cavity (12) to perform the reaming/bevelling on the inside of the pipe (t).

The quantity of pipes (t) of different diameters that can be gauged and reamed/bevelled on the same pipe cutter is limited, exclusively, by the physical dimensions of the body (1) of the pipe cutter.

The materials, dimensions, proportions and, in general, those other accessory or secondary details that do not essentially alter, change or modify the proposal, can be variable.

The terms in which this report is written are a true reflection of the object described, and must be taken in their broadest sense, and never in a limiting manner.

The invention claimed is:
1. A pipe cutter comprising:
a body;
at least one gauge attached on the body, the at least one gauge comprising a solid of revolution and including a mouth that varies between a minimum diameter and a maximum diameter, wherein a tip of the mouth has the minimum diameter and a portion of the mouth having the maximum diameter is located a first distance from the tip;
a cavity defined between the at least one gauge and the body, the cavity being adapted to receive an end of a pipe having a selected size that corresponds to the at least one gauge; and
at least one blade proximate the cavity, the blade being disposed at a second distance from the tip, the second distance being greater than the first distance;
wherein the mouth of the at least one gauge is adapted to adjust a diameter of the end of the pipe to the selected size when the pipe is engaged with and turned on the gauge; and
wherein the at least one blade is adapted to bevel and ream an edge of the end of the pipe.

2. A pipe cutter, according to claim 1, wherein the body of the pipe cutter has at least one beveller, structured in one or several portions (S) equipped with at least two converging edges at least one of them comprising the at least one blade that reaches the cavity; and where said portions (S) can be arranged in any angular position with respect to a main axis of the pipe cutter.

3. A pipe cutter, according to claim 2, wherein the one or several portions (S) are formed in a single beveller; and are of different widths (S1), (S2), (S3) in correspondence with the different diameters of the pipes (t) to be bevelled.

4. A pipe cutter, according to claim 3, wherein the single beveller is arranged longitudinally to the body of the pipe cutter, and the at least one blade defined on the one or several portions has a cutting zone in chamber, where, simultaneously, the at least one blade formed on the one or several portions bevels/reams the inside of the cut pipe edge, and the at least one blade formed on the one or several portions that is a contiguous portion bevels/reams the outside of the cut pipe edge.

5. A pipe cutter, according to claim 2, wherein the one or several portions (S) are formed in different/independent bevellers.

6. A pipe cutter, according to claim 2, wherein each portion of the one or several portions (S) is arranged transversally to the body of the pipe cutter forming part of a single beveller or of independent bevellers; and the at least one blade defined on each portion of the one or several portions (S) have two "V" angled cutting zones, in which, respectively, simultaneously bevel and ream the inside and outside of the cut pipe (t) edge.

7. A pipe cutter, according to claim 1, wherein in the body several gauges of different diameters are formed; between them and the body are delimited several cavities capable of accepting ends of pipes (t) of different diameters, that are positioned on a corresponding one of the gauges; and where each two contiguous blades reach two diametrically opposite zones of a single cavity of said several cavities.

8. The pipe cutter, according to claim 1, wherein:
the at least one gauge is an independent element that is fastened on the body using one or more fasteners;
the at least one gauge is integrated with the at least one blade.

9. The pipe cutter, according to claim 8, wherein the blade is disposed proximate the at least one gauge.

10. The pipe cutter, according to claim 8, further comprising:

a second gauge attached to the body, the second gauge including a second mouth that varies between a second minimum diameter and a second maximum diameter, the second maximum diameter being different from the maximum diameter of the mouth of the at least one gauge;

a second cavity defined between the second gauge and the body, the second cavity being adapted to receive a second end of a second pipe having a second selected size that corresponds to the second gauge; and at least one second blade proximate the second cavity;

wherein the second mouth of the second gauge is adapted to adjust a second diameter of the second end of the second pipe to the second selected size; and wherein the at least one second blade is adapted to bevel and ream a second edge of the second end of the second pipe.

* * * * *